United States Patent
Adelman et al.

(10) Patent No.: US 8,069,187 B2
(45) Date of Patent: *Nov. 29, 2011

(54) SUGGESTING CONCEPT-BASED TOP-LEVEL DOMAIN NAMES

(75) Inventors: Warren Adelman, Scottsdale, AZ (US);
Matthew Jallo, Phoenix, AZ (US);
Shawn Fitzpatrick, Phoenix, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 541 days.

This patent is subject to a terminal disclaimer.

(21) Appl. No.: 12/055,905

(22) Filed: Mar. 26, 2008

(65) Prior Publication Data
US 2009/0248735 A1   Oct. 1, 2009

(51) Int. Cl.
*G06F 17/30* (2006.01)
(52) U.S. Cl. ........ 707/802; 707/737; 707/791; 707/794; 707/797; 707/803
(58) Field of Classification Search ............... 707/737, 707/791, 794
See application file for complete search history.

(56) References Cited

U.S. PATENT DOCUMENTS

| | | | |
|---|---|---|---|
| 400,981 A * | 4/1889 | Rigney | 475/338 |
| 5,781,894 A | 7/1998 | Petrecca et al. | |
| 5,793,972 A | 8/1998 | Shane | |
| 5,905,862 A | 5/1999 | Hoekstra | |
| 5,918,014 A | 6/1999 | Robinson | |
| 5,948,061 A | 9/1999 | Merriman et al. | |
| 6,002,393 A | 12/1999 | Hite et al. | |
| 6,009,410 A | 12/1999 | LeMole et al. | |
| 6,026,368 A | 2/2000 | Brown et al. | |
| 6,119,098 A | 9/2000 | Guyot et al. | |
| 6,141,010 A | 10/2000 | Hoyle | |
| 6,216,129 B1 | 4/2001 | Eldering | |
| 6,256,633 B1 | 7/2001 | Dharap | |
| 6,285,987 B1 | 9/2001 | Roth et al. | |
| 6,298,341 B1 | 10/2001 | Mann et al. | |
| 6,332,158 B1 | 12/2001 | Risley et al. | |
| 6,377,936 B1 | 4/2002 | Henrick et al. | |
| 6,385,592 B1 | 5/2002 | Angles et al. | |
| 6,442,529 B1 | 8/2002 | Krishan et al. | |
| 6,496,857 B1 | 12/2002 | Dustin et al. | |
| 6,513,052 B1 | 1/2003 | Binder | |
| 6,519,589 B2 | 2/2003 | Mann et al. | |
| 6,560,634 B1 | 5/2003 | Broadhurst | |
| 6,601,041 B1 | 7/2003 | Brown et al. | |
| 6,615,247 B1 | 9/2003 | Murphy | |
| 6,745,248 B1 | 6/2004 | Gardos et al. | |
| 6,757,661 B1 | 6/2004 | Blaser et al. | |
| 6,892,181 B1 | 5/2005 | Megiddo et al. | |

(Continued)

OTHER PUBLICATIONS

Jun. 14, 2010 Non-Final Rejection, U.S. Appl. No. 12/055,610 (Publication US 2009-0248625 A1).

(Continued)

*Primary Examiner* — Shahid Alam
*Assistant Examiner* — Andalib Lodhi
(74) *Attorney, Agent, or Firm* — Chris A. Watt

(57) ABSTRACT

Methods and systems of the present invention allow for displaying suggested concept-based results. An exemplary method may comprise the steps of receiving a combination domain name and top level domain (TLD), determining from ontological calculations suggested TLDs related to the concept of the combination and displaying the suggested combination of the domain name with suggested TLDs.

15 Claims, 8 Drawing Sheets

U.S. PATENT DOCUMENTS

| | | | |
|---|---|---|---|
| 6,898,571 B1 | 5/2005 | Val et al. | |
| 7,136,932 B1 * | 11/2006 | Schneider | 709/245 |
| 7,386,438 B1 * | 6/2008 | Franz et al. | 704/8 |
| 7,400,981 B1 | 7/2008 | Rigney | |
| 7,680,860 B1 * | 3/2010 | Fordham | 707/741 |
| 7,805,426 B2 * | 9/2010 | Leung et al. | 707/706 |
| 2001/0039543 A1 * | 11/2001 | Mann et al. | 707/3 |
| 2002/0065903 A1 * | 5/2002 | Fellman | 709/220 |
| 2002/0091827 A1 | 7/2002 | King et al. | |
| 2002/0120639 A1 | 8/2002 | Basin et al. | |
| 2002/0129026 A1 * | 9/2002 | Reardon | 707/10 |
| 2002/0184172 A1 | 12/2002 | Shlain et al. | |
| 2003/0050863 A1 | 3/2003 | Radwin | |
| 2003/0149690 A1 | 8/2003 | Kudlacik et al. | |
| 2003/0217335 A1 | 11/2003 | Chung et al. | |
| 2004/0015397 A1 | 1/2004 | Barry et al. | |
| 2004/0059708 A1 | 3/2004 | Dean et al. | |
| 2004/0093327 A1 | 5/2004 | Anderson et al. | |
| 2004/0098360 A1 | 5/2004 | Witwer et al. | |
| 2004/0119740 A1 | 6/2004 | Chang et al. | |
| 2004/0167928 A1 | 8/2004 | Anderson et al. | |
| 2004/0167982 A1 * | 8/2004 | Cohen et al. | 709/226 |
| 2004/0172600 A1 | 9/2004 | Evans | |
| 2004/0181427 A1 | 9/2004 | Stobbs et al. | |
| 2004/0199520 A1 * | 10/2004 | Ruiz et al. | 707/100 |
| 2004/0205135 A1 | 10/2004 | Hallam-Baker | |
| 2004/0210640 A1 | 10/2004 | Chadwick et al. | |
| 2004/0249978 A1 | 12/2004 | Marappan et al. | |
| 2005/0010555 A1 | 1/2005 | Gallivan | |
| 2005/0065806 A1 | 3/2005 | Harik | |
| 2005/0071224 A1 | 3/2005 | Fikes et al. | |
| 2005/0102354 A1 | 5/2005 | Hollenbeck et al. | |
| 2005/0144069 A1 | 6/2005 | Wiseman et al. | |
| 2005/0216335 A1 | 9/2005 | Fikes et al. | |
| 2005/0222989 A1 | 10/2005 | Haveliwala et al. | |
| 2005/0234363 A1 | 10/2005 | Xue | |
| 2005/0246321 A1 | 11/2005 | Mahadevan et al. | |
| 2006/0047632 A1 | 3/2006 | Zhang | |
| 2006/0089947 A1 | 4/2006 | Gallivan et al. | |
| 2006/0190809 A1 | 8/2006 | Hejna | |
| 2006/0206516 A1 | 9/2006 | Mason | |
| 2007/0143235 A1 | 6/2007 | Kummamuru et al. | |
| 2007/0174255 A1 * | 7/2007 | Sravanapudi et al. | 707/3 |
| 2008/0007556 A1 | 1/2008 | Evans | |
| 2008/0104063 A1 | 5/2008 | Gallivan et al. | |
| 2008/0120292 A1 | 5/2008 | Sundaresan et al. | |
| 2008/0133479 A1 | 6/2008 | Zelevinsky et al. | |
| 2008/0195665 A1 * | 8/2008 | Mason et al. | 707/104.1 |
| 2008/0255937 A1 | 10/2008 | Chang et al. | |
| 2008/0256026 A1 | 10/2008 | Hays | |
| 2010/0039431 A1 | 2/2010 | Evans | |
| 2010/0100437 A1 | 4/2010 | Dean et al. | |

OTHER PUBLICATIONS

Jun. 11, 2010 Non-Final Rejection, U.S. Appl. No. 12/055,937 (Publication US 2009-0248736 A1).

Aug. 26, 2010 Response to Jun. 14, 2010 Non-Final Rejection, U.S. Appl. No. 12/055,610 (Publication US 2009-0248625 A1).

Aug. 26, 2010 Response to Jun. 11, 2010 Non-Final Rejection, U.S. Appl. No. 12/055,937 (Publication US 2009-0248736 A1).

Sep. 20, 2010 Final Rejection, U.S. Appl. No. 12/055,610 (Publication US 2009-0248625 A1).

Jan. 14, 2011 Response to Sep. 20, 2010 Final Rejection, U.S. Appl. No. 12/055,610 (Publication US 2009-0248625 A1).

Oct. 29, 2010 Non-Final Rejection, U.S. Appl. No. 12/055,905 (Publication US 2009-0248735 A1).

Jan. 14, 2011 Response to Oct. 29, 2010 Non-Final Rejection, U.S. Appl. No. 12/055,905 (Publication US 2009-0248735 A1).

Nov. 12, 2010 Final Rejection, U.S. Appl. No. 12/055,937 (Publication US 2009-0248736 A1).

Jan. 14, 2011 Response to Nov. 12, 2010 Final Rejection, U.S. Appl. No. 12/055,937 (Publication US 2009-0248736 A1).

Jan. 31, 2011 Notice of Allowance of U.S. Appl. No. 12/055,610 (Publication US 2009-0248625 A1).

Feb. 14, 2011 Non-Final Rejection, U.S. Appl. No. 12/055,881 (Publication US 2009-0248734 A1).

Apr. 4, 2011 Response to Feb. 14, 2011 Non-Final Rejection, U.S. Appl. No. 12/055,881 (Publication US 2009-0248734 A1).

Apr. 13, 2011 Notice of Allowance of U.S. Appl. No. 12/055,881 (Publication US 2009-0248734 A1).

* cited by examiner

SUGGESTING CONCEPT-BASED TOP-LEVEL DOMAIN NAMES

FIELD OF THE INVENTION

The present inventions generally relate to the field of Searching, Domain Names, Top Level Domains and Targeted Advertising, and more specifically, displaying concept-based results related to such information as Search Terms, Domain Names, Top Level Domains and Targeted Advertising.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC: BA98:0332:0000:CF8A:00C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic TLDs (gTLD) and delegates the responsibility to a particular organization (a "registry") for maintaining an authoritative source for the registered domain names within a Top-Level Domain (TLD) and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

SUMMARY OF THE INVENTION

An exemplary method for displaying concept-based results may comprise the step of receiving information. This information may include, but is not limited to one or more search terms, one or more domain names, any combination of a domain name and a TLD, or information relating to targeted advertising. A further step may comprise establishing an instance of an individual concept related to the information. The individual concept may then be used to identify a related class of concepts based on commonalities of attributes between the individual concept and the concepts in the class. These commonalities of attributes may further be used to establish relationships between the individual concept and each of the concepts within the class of concepts. The relationships may then be further refined to determine the concepts within the class of concepts most closely related to the individual concept. The concepts most closely related to the individual concept may then be used to calculate a plurality of results, and these results may then be displayed.

In an example embodiment of a system for displaying concept-based results, an Input Knowledge Agent, a Results Engine, a Database and an Output Knowledge Agent may be communicatively coupled to a Network to accomplish the steps outlined above.

The above features and advantages of the present invention will be better understood from the following detailed description taken in conjunction with the accompanying drawings.

DETAILED DESCRIPTION

Figure 1:
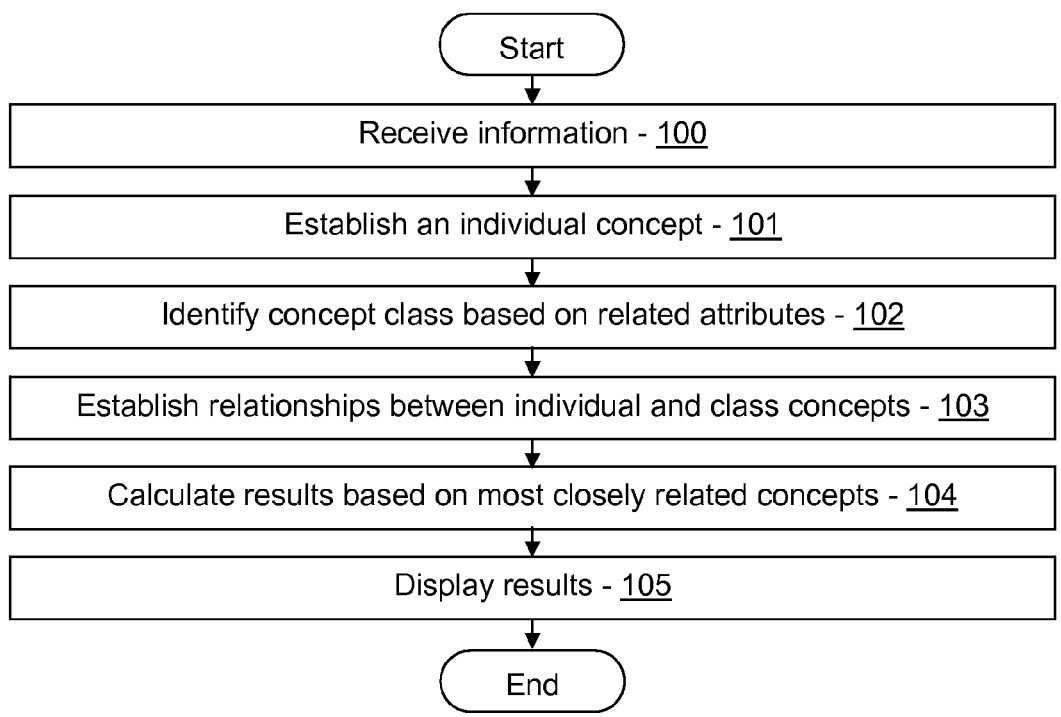
FIG. 1 is a flow diagram illustrating a possible embodiment of a method for displaying concept-based results.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A Method for Displaying Concept-Based Results.

Several different methods may be used to display concept-based results. In the streamlined example embodiment illustrated in FIG. 1, information may be received (Step 100), which may establish an instance of an individual concept related to the information (Step 101). A class of concepts may then be identified in which one or more attributes of the class may be related to one or more attributes of the individual concept (Step 102). Relationships between the individual concept and each of the concepts within the class of concepts identified may then be established (Step 103), These relationships may be used to determine those concepts which are most closely related to the individual concept, and the concepts within the class of concepts most closely related to the individual concept may then be used to calculate results (Step 104). These results may then be displayed (Step 105).

As seen in FIG. 1, received information (Step 100) may be used to establish an instance of an individual concept (Step 101). Receiving information (Step 100) may be accomplished by any means now known or later developed in the art for receiving information, including, but not limited to, human and/or non-human data transfer to and from any known information sources, electronic or otherwise.

To demonstrate in a non-limiting example the breadth of means through which information may be received (Step 100), information may be received (Step 100) from a user or a user control panel or any other means of receiving information which contains information about a user's setup preferences, location, demographics, previous search terms, previously searched domain names/TLDs, targeted advertisement strategies, keywords of parked pages, characteristics of search terms, targeted advertisement strategies and/or parked pages, characteristics of domain names and/or TLDs within the user's portfolio, and/or any other information relevant to establishing an instance of an individual concept (Step 101).

In the event that the user may not have established a targeted advertising strategy in the example above, the current invention may further receive information (Step 100) from user requests for help in identifying ideal keywords or adjusting bids for such an advertising strategy, or even based solely on the user's domain name.

Likewise, information may be received (Step 100) from the user navigating to a parked page. Information may be gleaned from the URL or any other means of navigating to such a page by the user. In short, any means of receiving information (Step 100) may be used by the current invention to establish an instance of an individual concept (Step 101).

Individuals, also referred to as instances, are the basic components of an ontology. One of the general purposes of an ontology is to provide a means of establishing and/or classifying individuals or instances of individuals, such as the individual concept (Step 101).

For purposes of this disclosure, an ontology is defined as a representation of a set of concepts within a domain and the relationships between those concepts. The ontology may be used to reason about the properties of the set or domain, and may be used to define the set or domain.

The terms "set" and "domain" used in the definition of ontology above and domain ontology below are to be understood as they are used in the art of set theory. Set theory may be defined as a mathematical theory of sets, also referred to as groups or collections, which represent collections of abstract objects or concepts, and the elements of and membership in such collections. It should be noted that domain as a mathematical concept is distinct from a domain name used in multiple examples below.

A domain ontology, also referred to as a domain-specific ontology, may model a specific domain or part of the world. The domain ontology may represent the particular meanings of terms as they would apply to the concepts within a domain. For example, the term "steer" may have different meanings. An ontology about the domain of driving may model the concept of the term steer to refer to controlling a vehicle, whereas an ontology about the domain of cattle may model the concept of the term steer as referring to a "male cow."

By way of example and not limitation, in the context of the current invention, information may be received (Step 100) which may include a search term, domain name or advertising strategy keyword related to a cow or steer. The choice of cow or steer as the search term, domain name or advertising strategy keyword may establish an instance of an individual concept (Step 101) within an ontology relating to a cow or steer.

As further seen in FIG. 1, a class of concepts may then be identified wherein the attributes of concepts within the class are related to attributes of the instance of the individual concept (Step 102).

Attributes within an ontology may be used to describe objects within the ontology and concepts related to those objects. Each attribute may have a name and a value and may be used to store information specific to the attribute's concept object. As a non-limiting example, a cow may have the following attributes:
Name: Cow
Number of legs: 4
Gender: Female
Carnivore/Herbivore/Omnivore: Herbivore Classes of concepts in an ontology, also referred to as types, sorts, categories and kinds, may be defined as abstract groups, sets or collections of objects and conditions of group membership. A class may contain individuals, other classes or a combination of both. As a non-limiting example, the attributes of the individuals cow or steer may each share related attributes with each other and with objects within various classes. These related attributes may allow the cow or steer to be identified with the broad class of "mammal," the more specific class of "bovine," or the even more specific class of "cattle."

Continuing the non-limiting example above, although a cow and a steer may have different gender attributes, they share other related attributes such as number of legs, cloven hooves, etc. Because of these related attributes, a cow and a steer may both be included as objects represented within the same domain or class of concepts in an ontology. As such, the classes of mammal, bovine or cattle may be identified to apply to both a cow and a steer (Step 102).

Attributes may be used to describe the relationships, also referred to as relations, between objects in an ontology. As further seen in FIG. 1, relationships between the individual concept and the concept objects within the identified class may be established (Step 103).

Much of the power of ontologies comes from the ability to describe these relationships. Together, the set of relationships may describe the semantics of the domain. Ontologies may include additional types of relationships that further refine the semantics they model. These relationships may be domain-specific and may be used to answer particular types of questions.

As a non-limiting example, a relationship may be an attribute whose value is another object in the ontology, or similar to another object in the ontology. In the context of the non-limiting example above, this may be referred to as an "is-a" or "is-like" relationship respectively, so that a steer is-a "male cow," and a cow is-like a "female steer." Other non-limiting examples of relationships may include is-part-of, same-as, is-superclass-of, is-subclass-of, made-in, etc.

Continuing the non-limiting example above, related attributes between the individual concept and the concept objects may identify a cow or steer as individuals within the concept class bovine. (Step 102) These attributes (4 legs, cloven hoof, herbivore, etc.) may be further used to establish relationships between all objects within the related concept class such as bovine (Step 103). Based on these attributes, the class bovine may include further members such as "bison," "water buffalo," and "yak." These relationships may also be further refined to determine which members of the class are most closely related to the individual concept of cow or steer.

As further seen in FIG. 1 the relationships between the individual and class concepts may be used to calculate the most closely related results in response to the received information which established the individual concept (Step 104).

The calculation of the concept-based results may make use of the components of a system comprising a database and software program communicatively coupled to machine readable media and a network. Thus, the ontology may be applied in a non-limiting computer-science context of a system developed through software and database engineering. This system may further comprise a specification of the possible values of variables, and/or what amounts to relationship constraints described as attributes in a database.

Ontology engineering in this context may be concerned with making representational choices that capture the relevant attributes of concept objects of a class or domain at the highest level of abstraction while still being as clear as possible about the meanings of terms and concepts.

The ontology used may establish certain determinations based on the input or output of "knowledge agents", such as the information received in step 100 and the displayed results seen in step 105 respectively. The information received and/or displayed in such a system, software and/or database structure need to be logically consistent with the definitions and constraints of the ontology and the ontology may provide the "language" for communicating with such agents.

Ontologies may be formulated in languages which may be similar in expressive power to logical formalisms. Similarly, while an ontology may be formulated in some representation language, it may also be intended to work on a semantic level. This allows the ontology designer to be able to state semantic constraints without forcing a particular encoding strategy. In other words, the ontology may be independent of data modeling strategy or implementation.

The ontology language may comprise any formal language used to encode an. ontology which may make ontological statements, establish syntax and/or combine ontological languages. Such languages may include RDF, RDFS, OWL, DAML+OWL, KIF, Cycl or other languages developed by the Cyc project, Rule Interchange Format (RIF), F-Logic, Gellish and/or any other ontology languages now known or developed in the future or any combination thereof.

The requirements of database design of any ontology-related database may also need to be consistent with any ontology-related integrity constraints. For example, a conventional database model may represent the identity of individuals using a primary key that assigns a unique identifier to each individual. However, the primary key identifier may be a part of the modeling process which does not denote something in the class or domain. For example, a database may include a table "Bovine" which contains information about the class or domain, but the primary key may be considered a part of the modeling process rather than one of the attributes that identifies a member of the class Bovine.

In typical ontology formalisms an individual may be a member of a class or may have some attribute value without referring to any implementation patterns such as the use of primary key identifiers. Similarly, in an ontology, constraints may be represented that hold across relations in a simple declaration (Steer is a subclass of Bovine), which may be encoded as a join on foreign keys in the relational model.

Structurally, the ontology-related database may comprise any collection of data that is consistent with any ontology related integrity constraints. As non-limiting examples, the ontology-related database may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on a server, a computer, a client, another server, or any other storage device.

As further seen in FIG. 1, once the calculations of concept-based results based on the concepts within the class most closely related to the individual concept are complete, these results may be displayed (Step 105). These results may include any results related to the information received in step 100. As non-limiting examples, these results may comprise, but are not limited to Search Results, Domain Names, combinations of Domain Names and TLDs or information or content related to Targeted Advertising.

Figure 2:
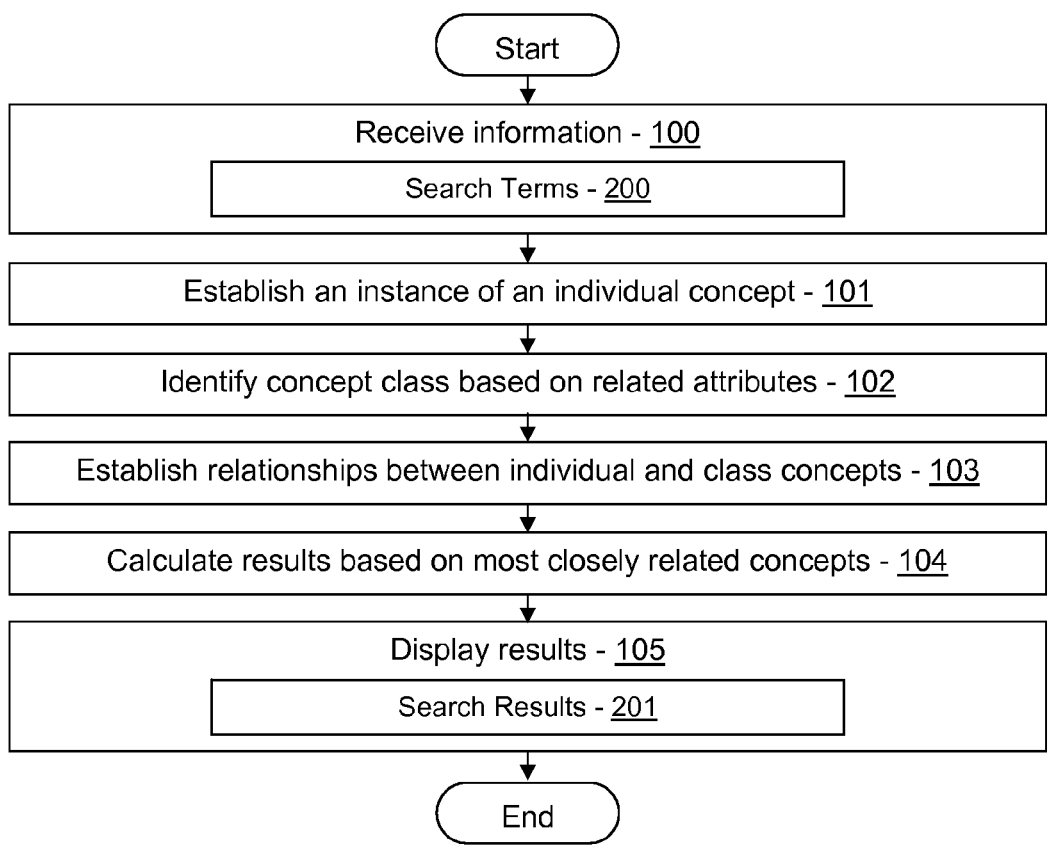
FIG. 2 is a more detailed flow diagram illustrating a possible embodiment of a method for displaying search results.

A more detailed example embodiment of a method for displaying Search Results is illustrated in FIG. 2. In this example embodiment, information received (Step 100) may include one or more Search Terms 200.

The steps in the streamlined example embodiment illustrated in FIG. 1, outlined above and incorporated herein by reference, may then be performed. The one or more Search Terms 200 may be used to establish an instance of an individual concept being searched (Step 101). A class of concepts may then be identified wherein one or more attributes may be related to one or more attributes of the individual Search Terms 200 concept (Step 102). These attributes may then be used to establish a plurality of relationships between the individual concept and each of the concept objects within the class of concepts (Step 103) based on the Search Terms 200 concept.

Calculations may then be performed to establish a plurality of Search Results 201 based on the concepts within the class of concepts most closely related to the individual concept being searched (Step 104). A list of the plurality of Search Results 201 calculated may then be displayed (Step 105).

Preferably, the list of Search Results 201 displayed (Step 105) may be displayed with the most closely related Search Result 201 listed first, with each subsequent result less closely related than the result before it.

As a non-limiting example, if the Search Terms 200 "steer and feed and health" are received, the current invention may use these Search Terms 200 to establish an instance of an individual concept (Step 101), wherein a steer as a living organism may be central to the concept. The additional search terms may be used to make it clear that "steer" as it relates to moving vehicles is not being searched.

The current invention may then compare common attributes of steers with attributes within concept classes. Once the invention identifies one or more concept classes wherein the members of the class share common attributes with steers (Step 102), such as mammal, bovine and cattle, relationships may be established using these attributes (Step 103).

Ontology-based calculations utilizing, but not limited to input and/or output knowledge agents, one or more ontology languages and ontology-related database structures or any combination thereof may then analyze these relationships and determine the most closely related suggested Search Results 201 (Step 104). These suggested Search Results 201 may then be displayed (Step 105). In the preceding example, Search Results 201 related to cows may be higher on the list of a search for "steer and feed and health" than bison, water buffalo or yak.

Figure 3:
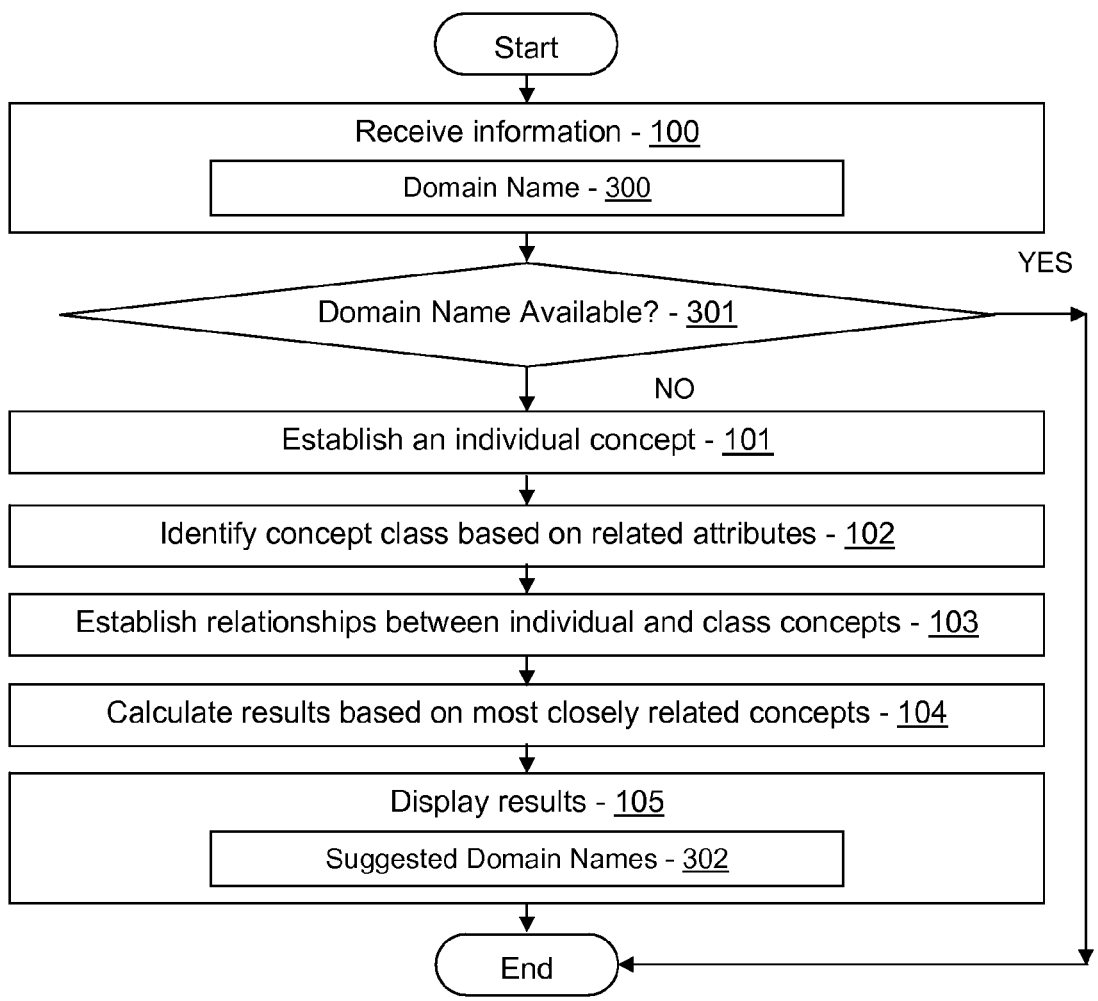
FIG. 3 is a more detailed flow diagram illustrating a possible embodiment of a method for displaying suggested domain names.

A more detailed example embodiment of a method for displaying Suggested Domain Names is illustrated in FIG. 3. In this example embodiment, information received (Step 100) may include one or more Domain Names 300.

The current invention may then use the Domain Name 300 to determine if the Domain Name 300 is available (Step 301) to be registered. If the Domain Name 300 is available (Step 301), the process ends. The Domain Name may then be registered within a registry by any means of registering domain names currently known in the art. However, such registration will not be described here as it is beyond the scope of this invention.

The steps in the streamlined example embodiment illustrated in FIG. 1, outlined above and incorporated herein by reference, may then be performed. The one or more Domain Names 300 may be used to establish an instance of an individual concept related to the Domain Name 300 (Step 101). A class of concepts may then be identified wherein one or more attributes may be related to one or more attributes of the Domain Name 300 concept (Step 102). These attributes may then be used to establish a plurality of relationships between the individual concept and each of the concept objects within the class of concepts (Step 103) based on the Domain Name 300 concept.

Calculations may then be performed to establish a plurality of Suggested Domain Names 302 based on the concepts within the class of concepts most closely related to the individual Domain Name 300 concept (Step 104). A list of the plurality of Suggested Domain Names 302 calculated may then be displayed (Step 105).

Preferably, the list may be displayed (Step 105) with the most closely related Suggested Domain Name 302 listed first, with each subsequent result less closely related than the result before it.

As a non-limiting example, if the Domain Name 300 "steercars.com" is received, the current invention may determine if the Domain Name 200 steercars.com is available. If so, the Domain Name 300 may be registered. If the Domain Name 300 is not available, the current invention may then use this Domain Name 300 to establish an instance of an individual concept (Step 101), wherein "steer" as it relates to moving vehicles such as "cars" may be central to the concept. The context of the Domain Name 300 may be used to make it clear that steer as a living organism is not a desired domain name.

The current invention may then compare common attributes of "steer" and "cars" with attributes within concept classes. Once the invention identifies one or more concept classes wherein the members of the class share common attributes with steer and cars (Step 102), such as "vehicle navigation," relationships may be established using these attributes (Step 103).

Ontology-based calculations utilizing, but not limited to input and/or output knowledge agents, one or more ontology languages and ontology-related database structures or any combination thereof may then analyze these relationships and determine the most closely related Suggested Domain Names 302 (Step 104). These Suggested Domain Names 302 may then be displayed (Step 105). In the preceding example, the Suggested Domain Name 302 rightturnonred.com may be higher on the list of Suggested Domain Names 302 than truckcontrol.com.

Figure 4:
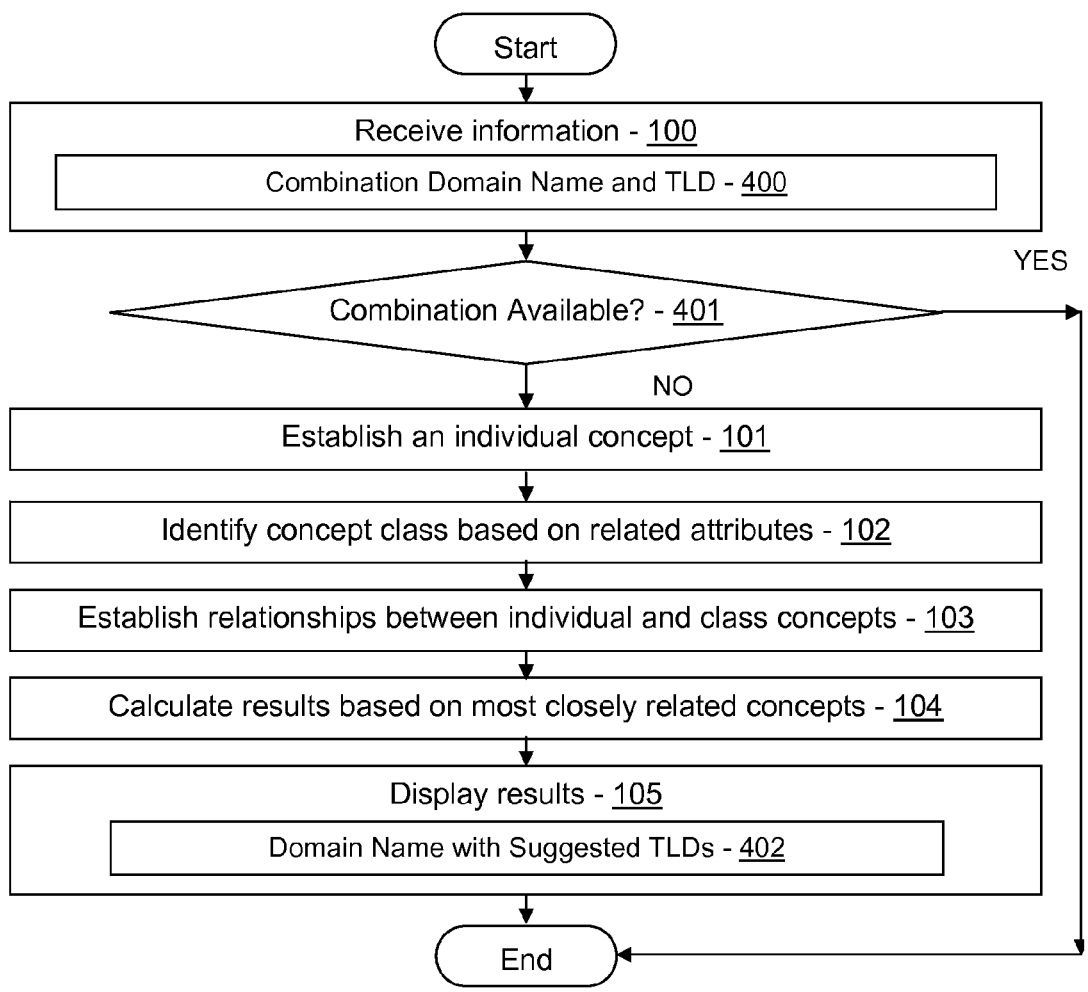
FIG. 4 is a more detailed flow diagram illustrating a possible embodiment of a method for displaying suggested combination domain names/TLDs.

A more detailed example embodiment of a method for displaying a Domain Name with Suggested TLDs is illustrated in FIG. 4. In this example embodiment, information received (Step 100) may include one or more Combinations of a Domain Name and a TLD 400.

The current invention may then use the received Combination 400 to determine if the Combination 400 is available (Step 401) to be registered. If the Combination 400 is available (Step 401), the process ends. The Combination 400 may then be registered within a registry by any means of registering domain names currently known in the art. However, such registration will not be described here as it is beyond the scope of this invention.

The steps in the streamlined example embodiment illustrated in FIG. 1, outlined above and incorporated herein by reference, may then be performed. The domain name within the one or more Combinations 400 may be used to establish an instance of an individual domain name concept (Step 101). A class of concepts may then be identified wherein one or more attributes may be related to one or more attributes of the domain name concept (Step 102). These attributes may then be used to establish a plurality of relationships between the individual concept and each of the concept objects within the class of concepts (Step 103) based on the domain name concept.

Calculations may then be performed to establish a plurality of Suggested TLDs in combination with the domain name 402 based on the concepts within the class of concepts most closely related to the individual domain name concept within the Combination 400 (Step 104). A list of the plurality of calculated Suggested TLDs in combination with the domain name 402 may then be displayed (Step 105).

Preferably, the list displayed (Step 105) may be displayed with the most closely related combination of Domain Name with a Suggested TLD 402 listed first, with each subsequent result less closely related than the result before it.

As a non-limiting example, if the Combination of the Domain Name and the TLD 400 "shoparizonacarsinfo.com" is received, the current invention may determine if the Combination 400 of shoparizonacarsinfo.com is available. If so, the Combination 400 may be registered. If the Combination 400 is not available, the current invention may then use this Combination 400 to establish an instance of an individual domain name concept (Step 101), wherein "shop," "Arizona," "cars" and/or "info" may be central to the concept. The context of the words within the Combination 400 may be used to make clear the concepts desired in the domain name. The current invention may then compare common attributes of shop, Arizona, cars and/or info with attributes within concept classes. Once the invention identifies one or more concept classes wherein the members of the class share common attributes with shop, Arizona, cars and/or info (Step 102), such as "vehicle information," "vehicle purchasing by state," "US states," etc., relationships may be established using these attributes (Step 103).

Ontology-based calculations utilizing but not limited to input and/or output knowledge agents, one or more ontology languages and ontology-related database structures or any combination thereof may then analyze these relationships and determine the most closely related Suggested TLDs in combination with the domain name 402 (Step 104). These Suggested TLDs in combination with the domain name 402 may then be displayed as a list (Step 105).

In the preceding example, the Domain Name with Suggested TLD 402 shoparizonacarsinfo.info may be higher on the list because the concept of this domain name seems most concerned with information and facts. Subsequent Domain Names with Suggested TLDs may include shoparizonacarsinfo.us, shoparizonacarsinfo.shop, etc.

In a similar non-limiting example, the geographic information from the control panel, or alternatively, regional spellings of words that indicate a language associated with a country may be used to suggest a related TLD. For example, if a Domain Name 300 or Combination 400 included the words colour, centre, behaviour, etc., the current invention may determine that these words are spelled in a British fashion, and thus .co.uk may be offered higher in the list of Suggested TLD's 402 than .us. Likewise, ccTLDs for Spanish-speaking nations may be offered based on recognized Spanish words, etc.

Figure 5:
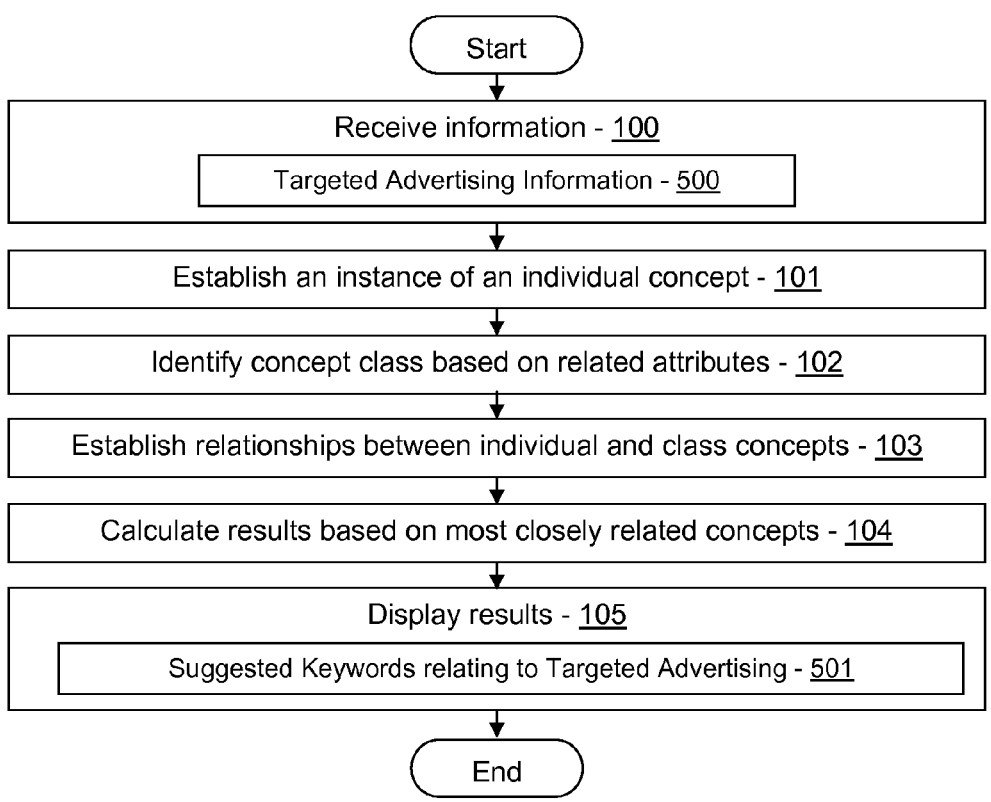
FIG. 5 is a more detailed flow diagram illustrating a possible embodiment of a method for displaying suggested keywords relating to targeted advertising.

A more detailed example embodiment of a method for displaying Suggested Keywords relating to Targeted Advertising is illustrated in FIG. 5. In this example embodiment, information received (Step 100) may include one or more pieces of Targeted Advertising Information 500.

Many types of Targeted Advertising Information 500 may be used in the context of the current invention. By way of example and not limitation, such Targeted Advertising Information 500 may comprise information being used in setting up an online advertising campaign, including identification of ideal keywords used in such a campaign, adjusting bids for such a campaign, etc. The use of the current invention in such an online advertising campaign may provide means for identifying ideal Suggested Keywords relating to Targeted Advertising 501 for the campaign with minimal effort on the part of the user. In fact, even if only the domain name associated with such a campaign is provided, this may represent Targeted Advertising Information 500 sufficient to provide Suggested Keywords 501.

The steps in the streamlined example embodiment illustrated in FIG. 1, outlined above and incorporated herein by reference, may then be performed. The Targeted Advertising Information 500 may be used to establish an instance of an individual concept relating to the Targeted Advertising Information 500 (Step 101). A class of concepts may then be identified wherein one or more attributes may be related to one or more attributes of the Targeted Advertising Information 500 concept (Step 102). These attributes may then be used to establish a plurality of relationships between the individual concept received and each of the concept objects within the class of concepts (Step 103) based on the Targeted Advertising Information 500 concept.

Calculations may then be performed to establish a plurality of Suggested Keywords relating to Targeted Advertising 501 based on the concepts within the class of concepts most closely related to the individual Targeted Advertising Information 500 concept (Step 104). The plurality of calculated Suggested Keywords relating to Targeted Advertising 501 may then be displayed (Step 105).

Preferably, the suggested keywords displayed (Step 105) may be displayed with the most closely related Suggested Keywords 501 displayed first, with each subsequent result less closely related than the result before it. Any or all of the Suggested Keywords 501 may then be applied to any desired targeted advertising.

To continue the non-limiting example above, the Suggested Keywords relating to Targeted Advertising 501 may be applied to an online advertising campaign using a parked domain page. Potential visitors to such a parked domain page may be more efficiently directed if the advertising or other content on the page is customized through use of the current invention.

Figure 6:
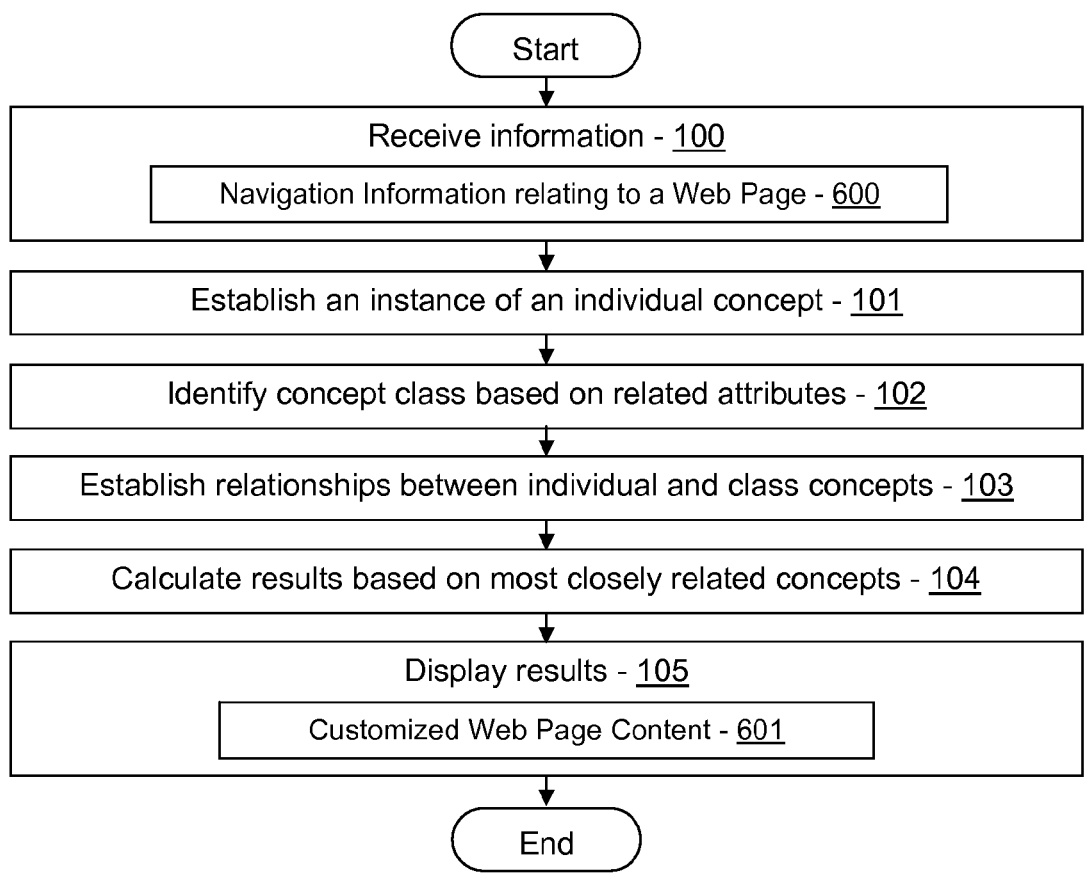
FIG. 6 is a more detailed flow diagram illustrating a possible embodiment of a method for displaying customized web page content.

A more detailed example embodiment of a method for displaying Customized Web Site Content is illustrated in FIG. 6. In this example embodiment, information received (Step 100) may include one or more pieces of Navigation Information relating to a Web Page 600.

Many types of Navigation Information 600 may be used in the context of the current invention. By way of example and not limitation, such Navigation Information 600 may comprise information being used to reach a particular web page such as a parked domain page, including a web page URL, or the content of a link used to navigate to such a web page, or hidden information being passed as part of an HTML form, etc. The use of the current invention in conjunction with such Navigation Information 600 may provide means for providing Customized Web Page Content 601 (e.g. THE GO DADDY GROUP's GO DADDY CONNECTIONS) with minimal effort on the part of the user. This parked domain page example is non-limiting in that any type of content-driven web page, such as a portal, could also utilize the current invention.

The steps in the streamlined example embodiment illustrated in FIG. 1, outlined above and incorporated herein by reference, may then be performed. The Navigation Information relating to a Web Page 600 may be used to establish an instance of an individual concept relating to the Navigation Information 600 (Step 101). A class of concepts may then be identified wherein one or more attributes may be related to one or more attributes of the Navigation Information 600 concept (Step 102). These attributes may then be used to establish a plurality of relationships between the individual concept received and each of the concept objects within the class of concepts (Step 103) based on the concept relating to the Navigation Information 600.

Calculations may then be performed to establish a plurality of Customized Web Page Content 601 based on the concepts within the class of concepts most closely related to the individual Navigation Information 600 concept (Step 104). A plurality of calculated Customized Web Page Content 601 relating to Navigation Information 600 may then be displayed (Step 105).

Preferably, the Customized Web Page Content 601 displayed (Step 105) may be displayed with the most relevant content displayed first, with each subsequent result less closely related than the result before it.

As a non-limiting example, as the nature of online advertising evolves to allow easier, more hands-off ways of running online ad campaigns, a novice user may seek the simplest possible way to set up an online advertising campaign like that in the non-limiting example above. The user may prefer to enter nothing more than a domain name such as businessnews.info which may be associated with such a campaign.

The user is, of course, not limited to the domain name as the only Targeted Advertising Information 500. Additional information relating to specific keywords for parked pages such as "news," "finance," "marketing," "Wall Street," etc., or information relating to adjusting bids as part of a campaign, as two non-limiting examples, may also be entered by a user and received by the current invention (Step 100).

The current invention may then use this Targeted Advertising Information 500 to establish an instance of an individual Targeted Advertising 500 concept (Step 101), wherein "business" and "news" may be central to the concept. The context of the words within the Targeted Advertising Information 500 may be used to make clear the concepts in the information related to the advertising campaign. The current invention may then compare common attributes of business and/or news with attributes within concept classes. Once the invention identifies one or more concept classes wherein the members of the class share common attributes with business and/or news (Step 102), such as "financial strategies," "online marketing," "Wall Street news," etc., relationships may be established using these attributes (Step 103).

Ontology-based calculations utilizing but not limited to input and/or output knowledge agents, one or more ontology languages and ontology-related database structures or any combination thereof may then analyze these relationships and determine the most closely related Suggested Keywords 501 relating to Targeted Advertising 500 concept (Step 104). These Suggested Keywords 501 may then be displayed as a list (Step 105) of options to add if the user has set up keywords, or of options to use as keywords if no keywords have been set up.

In the preceding example, the Suggested Keywords 501 "business" and "news" may be suggested before "marketing" because the concept of the Targeted Advertising Information 500 seems most concerned with these concepts. Additional keywords, subsequently listed may include finance, marketing, Wall Street, etc.

Once the parked domain page or portal is set up, Customized Web Page Content 601 may be provided for potential visitors who navigate to the parked domain page or portal via Navigation Information 600 such as entering "businessnews.info" into a browser, clicking a link which reads "Find Business News Here," etc. The current invention may then use the Navigation Information relating to a Web Page 600 to generate the Customized Web Page Content 601 for the parked domain page or portal.

The current invention may then use this Navigation Information 600 to establish an instance of an individual Navigation Information 600 concept (Step 101), wherein "business" and "news" may be central to the concept. The context of the words within the Navigation Information 600 may be used to make clear the concepts desired in the information. The current invention may then compare common attributes of business and/or news with attributes within concept classes. Once the invention identifies one or more concept classes wherein the members of the class share common attributes with business and/or news (Step 102), such as "financial advisors," "online marketing consultants," "Wall Street Journal subscriptions," etc., relationships may be established using these attributes (Step 103).

Ontology-based calculations utilizing but not limited to input and/or output knowledge agents, one or more ontology languages and ontology-related database structures or any combination thereof may then analyze these relationships and determine the most closely related Customized Web Page Content 601 relating to Navigation Information 600 (Step 104). This Customized Web Page Content 601 may then be displayed (Step 105), with the most closely related content displayed in a way to make the most use of the web page real estate.

In the preceding example, the Customized Web Page Content 601 may place the most relevant content where it is easiest to see and discern.

Figure 7:
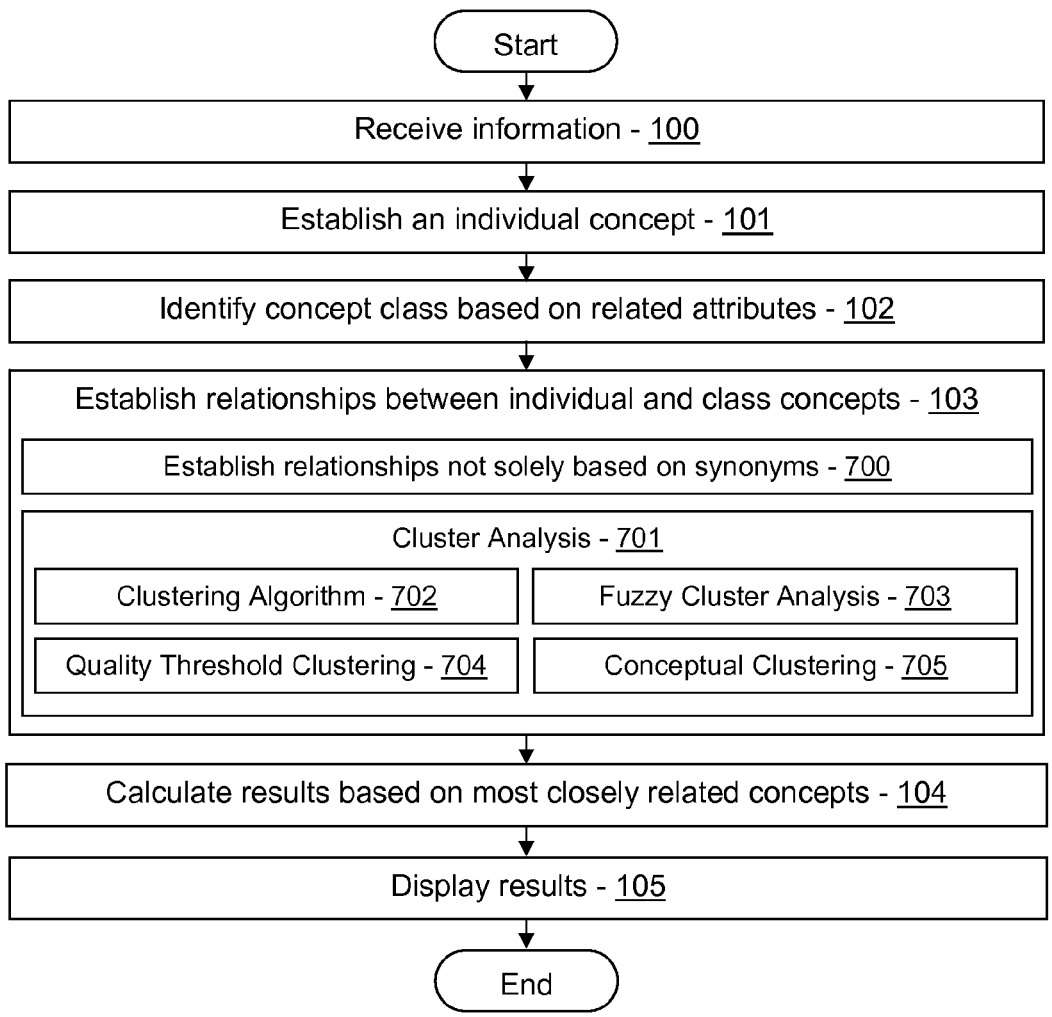
FIG. 7 is a more detailed flow diagram illustrating a possible embodiment of a method for displaying concept-based results.

In the embodiment of a method for displaying concept-based results illustrated in FIG. 7, the step of establishing a plurality of relationships between the individual concept and each of the concepts within the class of concepts may be established (Step 103) on the basis of factors other than one or more synonyms (Step 700) of the received information (Step 100).

Currently-used algorithms to display concept-based results may be based on synonyms of key words received. This approach may limit the results to only synonyms of key words.

The current invention may use, but is not limited to, ontological based algorithms to calculate and display results (Step 105). These algorithms may be in addition to, but are independent of any synonym-based algorithms. This allows results to be displayed which may include concepts related to the information received and not just synonyms alone (Step 700).

As a non limiting example, search terms, domain names, combination domain names/TLDs or targeted advertising information may be received (Step 100) including the word "Fork." Because the word Fork lacks any accurate synonyms, the current invention may establish relationships (Step 103) beyond synonyms alone (Step 700) based on an ontological analysis. This analysis may calculate and display concept-based results (Step 105), as outlined below.

In the example embodiment illustrated in FIG. 7, the current invention may use Cluster Analysis 701 to establish these relationships (Step 103). For purposes of this disclosure, Cluster Analysis 701, also referred to as Automatic Classification, Numerical Taxonomy, Clustering, Data Clustering, Botryology and Typological Analysis, may be defined as a classification of objects into different groups, or more precisely, the partitioning of a data set into subsets or clusters, so that the data in each subset or cluster ideally share some common trait.

To continue the non-limiting example above, the word Fork (Step 100) may share some common traits with Knives and Spoons, and thus may be classified to belong to the cluster "Silverware." Silverware may likewise be classified as a subset of "Kitchen Utensils."

Any animate objects, inanimate objects, places, concepts, events, properties, and relationships may be classified according to some clustering or taxonomic scheme. Clustering Algorithm 702, Fuzzy Cluster Analysis 703, Quality Threshold Clustering 704 and/or Conceptual Clustering 705 may use any taxonomic scheme, including, but not limited to clustering, now known or later developed in the art to classify clusters with common traits.

In an algorithm such as Clustering Algorithm 702, clusters may be composed of taxonomic units or nodes, which may be concept objects arranged in a hierarchical structure, typically comprising relationships such as, but not limited to is-a, sub-type-supertype, is-subtype-of, is-subclass-of, is-superclass-of or parent-child relationships.

Clustering Algorithm 702 may further comprise a tree-like structure of classifications for a given set of objects or, more generally, a partially ordered set that clearly depicts the relationships between the set of concept objects. In such a structure, each object may be the "child/subsumed" of a "parent/subsuming" class.

At the top of this structure may be a single classification, the root node, which may apply to all objects. Nodes below this root may be more specific classifications that apply to subsets of the total set of classified objects. The subsumption relationship may be used to create a hierarchy of classes, typically with a maximally general class like Thing at the top, and very specific classes like Fork at the bottom.

The child/subsumed class may inherit the properties from the parent/subsuming class. Thus, anything that is necessarily true of a subsuming parent class may also be true of all of its subsumed child classes. In such a parent-child relationship the child may have the same constraints as the parent plus one or more additional constraints. So, a Fork needs to satisfy more constraints to be a Fork than to be Silverware.

The child/subsumed class may also have polymorphic features which allow it to function in different ways. For purposes of this disclosure, polymorphism may be defined as the ability of a child class to cope with and localize change, thus giving each concept object appropriate type-specific behavior. Each of the child classes may share common attributes with the parent class, and thus have similar features. The abstraction of the parent class may allow the more specific child classes to have different features or attributes. The child class may not have to inherit every element of the parent. In other words, the child may do some of the things that the parent does but does them differently. Thus the attributes of the child class may be different based on such polymorphic changes.

To continue the non-limiting example above, the word Fork (Step 100) shares common traits with Knives and Spoons and thus may be classified to belong to the cluster Silverware (Step 102) in a tree structure as follows:

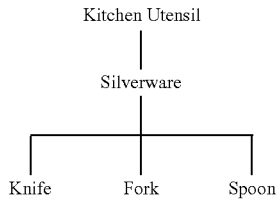

In this example, Silverware subsumes Fork and Kitchen Utensils subsumes Silverware, since any member of Silverware is also a member of Kitchen Utensils.

In the context of Clustering Algorithm 702, the best-fitting numerical equations may be used to characterize or solve all measureable quantities of a set of objects through cluster analysis.

In other words, in this example Clustering Algorithm 702 may be used in a Cluster Analysis (Step 701) to determine a hierarchy of nodes, which in turn may establish relationships between individual and class concepts (Step 103). Knives, Forks and Spoons, for example, may each be determined to be individual concepts (Step 101), which belong to the cluster Silverware and each may have a child-parent or is-a relationship with Silverware.

However, because of the polymorphic properties of the Clustering Algorithm 702, each of the Knives, Forks and Spoons may have different attributes. For example, although a Knife, Fork and Spoon each have a handle, a Fork or Spoon may not be the best piece of Silverware to use in cutting.

These established relationships may then be used to calculate results based on which concepts are the most closely related (Step 104). Because Fork has no accurate synonym, the Clustering Algorithm 702 may use concepts to establish these relationships (Step 103), rather than relationships established based solely on synonyms (Step 700).

In this example, Knife, Fork and Spoon all exist on the same level of the hierarchy, and Silverware is the closest parent level within the hierarchy, so any of these concepts may be displayed as results (Step 105).

In some ontologies and ontology languages, a class may only be allowed to have one parent (single inheritance), but in most ontologies, classes may be allowed to have any number of parents (multiple inheritance). In multiple inheritance, all necessary properties of each parent may be inherited by the subsumed child class. Thus, for example, a particular class of utensil (Fork) may be a child of the class Silverware and also a child of the class Plastic ware.

Clustering may also apply to relationship schemes other than parent-child hierarchies, such as network structures with other types of relationships. One non-limiting example of this type of relationship is the meronymy relation, written as "part-of", that represents how objects combine together to form composite objects. In a non-limiting example, rock may be a component of a planet, if a planet is considered a "Giant Orbiting Rock." If meronymy relationships are introduced to an ontology, the simple tree structure may quickly become complex and more difficult to interpret.

To allow the Cluster Analysis (Step 701) to deal with such complexity, a Fuzzy Cluster Analysis 703, illustrated in FIG. 7, may be used to more clearly establish the relationships between individual and class concepts (Step 103).

In fuzzy clustering, each point may have a degree of belonging to clusters, as in fuzzy logic, rather than belonging completely to just one cluster. Thus, points on the edge of a cluster may be in the cluster to a lesser degree than points in the center of a cluster.

To determine the "proximity" within the cluster, a data structure may be utilized which may be a hierarchy or tree wherein each node represents a given concept. Each concept may represent a set, a multi-set or "bag" of objects, each object being represented as a binary-valued property list. The data associated with each tree node which represents a concept may be the integer property counts for the objects in that concept. The concept description may be the category-conditional probability/likelihood of the properties at the node.

To continue with the non-limiting example above, the concept object "planet" may be represented by a set of properties including the following:

Size: Giant
Activities: Orbiting
Matter: Rock

The determination of the proximity of similar concepts within the Fuzzy Cluster Analysis 703 may be based on the probability of the concept description at a given node having equal or similar properties to the individual concept. Thus, in the non-limiting example above, a "moon", based on its properties, may likewise be considered a giant orbiting rock, and based on Fuzzy Cluster Analysis 703 may be considered in close proximity to the concept of a planet.

Because of the breadth of human language, acronyms, slang, etc. may drive the total words in the English language to over a million. To avoid dilution of concepts, a means of precision of concepts may be utilized. Such a means may comprise a concept similar to QT or Quality Threshold Clustering 704 seen in FIG. 7, which may be used to avoid such dilution.

The algorithm for such Quality Threshold Clustering 704 may include choosing a maximum proximity from concept clusters and including only those concept clusters which are within the maximum proximity.

Many types of clustering may be used in the current invention. Because the current invention utilizes the concepts related to received information, Conceptual Clustering 705, illustrated in FIG. 7, may also be used as part of the Cluster Analysis 701.

Conceptual Clustering 705 may be defined as a machine learning paradigm for unsupervised classification. It may be distinguished from ordinary clustering because it generates a concept description for each generated class. Most Conceptual Clustering 705 methods are capable of generating hierarchical category structures.

Conceptual Clustering 705 is obviously closely related to clustering; however, in Conceptual Clustering 705 it is not only the inherent structure of the data that drives cluster formation, but also the description language which is available to the learner.

Many conceptual clustering algorithms may be used to determine closely related data and the relationships between such data. Non-limiting examples of such algorithms include COBWEB, CLUSTER/2, CYRUS, GALOIS, GCF, INC, ITERATE, LABYRINTH, SUBDUE, UNIMEM and WITT.

A System for Displaying Concept-Based Results.

Figure 8:
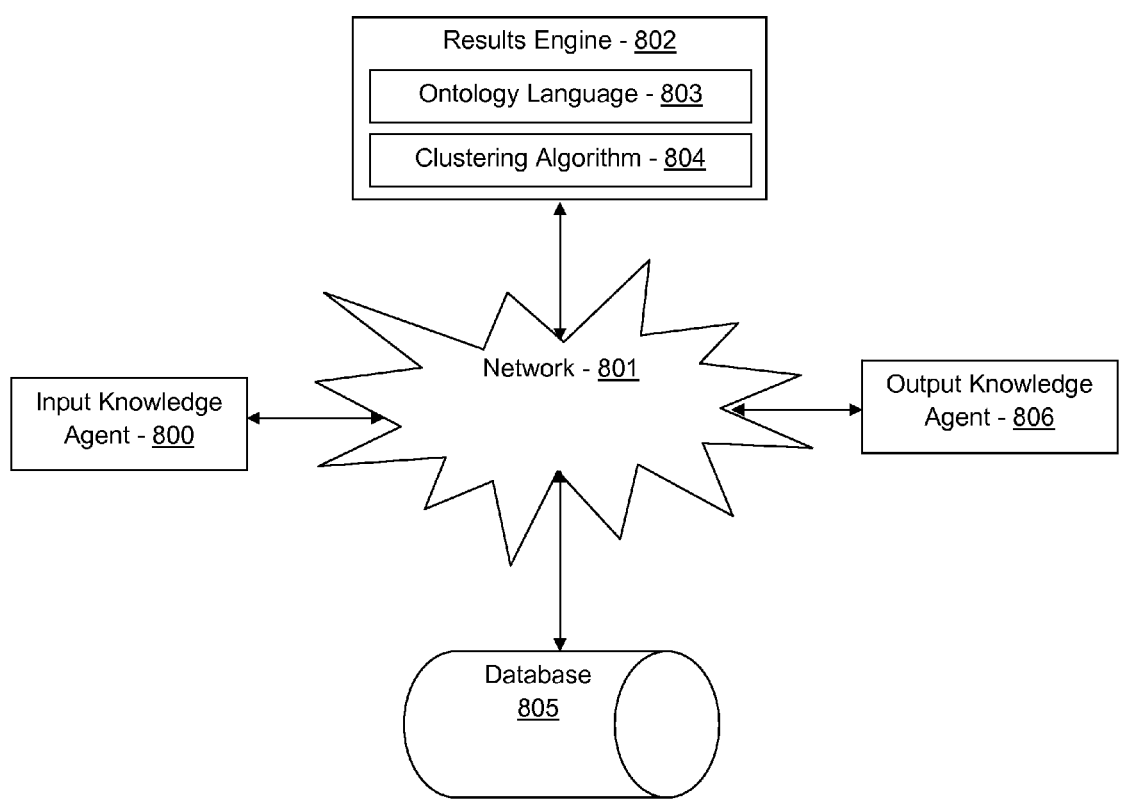
FIG. 8 illustrates a possible embodiment of a system for displaying concept-based results.

An example embodiment of a system for displaying concept-based results is illustrated in FIG. 8. The illustrated embodiment includes an Input Knowledge Agent 800, communicatively coupled to a Network 801, responsible for receiving information. A Results Engine 802 also may be communicatively coupled to the Network 801, and may comprise machine-readable media with instructions executable by a processor, which perform the steps of: i) establishing an individual concept ii) identifying a concept class based on attributes of the individual concept and concept objects in the concept class iii) establishing relationships between individual and class concepts and iv) calculating results based on the most closely related concepts.

A Database 805 may also be communicatively coupled to the Network 801 and may provide the data to drive the Results Engine 802. An Output Knowledge Agent 806 may also be communicatively coupled to the Network 801 and may be used to display results.

The example embodiments herein place no limitation on Network 801 configuration or connectivity. Thus, as non-limiting examples, the Network 801 could comprise the Internet, an intranet, an extranet, a local area network, a wide area network, a wired network, a wireless network, a telephone network, or any combination thereof.

The Input Knowledge Agent 800 may be communicatively coupled to a Network 801 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof. The Input Knowledge Agent 800 may be used to receive information, as described elsewhere in this specification and incorporated herein by reference.

The Results Engine 802 may be communicatively coupled to the Network 801 (perhaps using the methods described above) and comprises software-implemented logic (i.e., machine-readable media with instructions executable by a processor) that may perform an analysis of the Input Knowledge Agent 800, establish an individual concept, identify a concept class based on attributes of the individual concept and concept objects in the concept class, establish relationships between individual and class concepts and calculate results based on the most closely related concepts. The software-implemented logic may reside on any computer or server having a processor that is communicatively coupled to the Network 801.

The steps above may be accomplished through use of the Ontology Language 803 and the Clustering Algorithm 804, and based on information derived from the Database 805 each of which may be communicatively coupled to the Network 801 and all of which are described elsewhere in this specification and incorporated herein by reference.

The Output Knowledge Agent 806 may be communicatively coupled to the Network 801 and may display results as described elsewhere in this specification and incorporated herein by reference.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
   A. storing in a database one or more conceptual classes comprising a plurality of potential top level domains, wherein each potential top level domain in the plurality of potential top level domains comprises a plurality of attributes, wherein the plurality of potential top level domains within a conceptual class share a plurality of common attributes, and wherein the database and a server computer comprising a server software are communicatively coupled to a network;
   B. receiving a combination of a domain name and a top level domain from a client software on a client computer to determine if the combination is available to be registered;
   C. calculating, by the server software, a plurality of suggested top level domains comprising the steps of:
      i. establishing an instance of an individual concept for each of one or more words parsed from the domain name, wherein the instance of the individual concept comprises a meaning for each of the one or more words and wherein the meaning is derived from a context of the one or more words;
      ii. identifying the one or more conceptual classes which share one or more of the plurality of common attributes with the individual concept for each of the one or more words;
      iii. organizing the one or more conceptual classes identified into a hierarchy structure comprising one or more subsuming classes and one or more subsumed classes, wherein the one or more subsumed classes inherit the plurality of attributes from the one or more subsuming classes and wherein the one or more subsumed classes comprise one or more localized polymorphic changes to the plurality of attributes;
  iv. identifying a hierarchy level at which all of the plurality of attributes of the individual concept are not common to all of the plurality of attributes of the one or more words in the one or more subsumed classes; and
  v. returning one or more combinations of the domain name with the plurality of suggested top level domains derived by searching all of the one or more words on the hierarchy level; and
 D. displaying the one or more combinations of the domain name with the plurality of suggested top level domains on the client software.

2. The method of claim 1 wherein the one or more combinations of the domain name with the plurality of suggested top level domains are calculated according to one or more relationships between one or more of the plurality of common attributes shared by the one or more of the plurality of potential top level domains and the one or more words.

3. The method of claim 2 wherein the one or more relationships are established using a cluster analysis.

4. The method of claim 3 wherein the cluster analysis further comprises a clustering algorithm.

5. The method of claim 3 wherein the cluster analysis further comprises a fuzzy cluster analysis.

6. The method of claim 3 wherein the cluster analysis further comprises quality threshold clustering.

7. The method of claim 3 wherein the cluster analysis further comprises conceptual clustering.

8. A system comprising:
 A. a database communicatively coupled to a network and comprising:
  i. a plurality of potential top level domains;
  ii. a plurality of attributes for each of the plurality of potential top level domains; and
  iii. one or more conceptual classes comprising the plurality of potential top level domains, wherein the plurality of potential top level domains within a conceptual class share a plurality of common attributes;
 B. a client computer communicatively coupled to the network and comprising a client software configured to receive a combination of a domain name and a top level domain to determine if the combination is available to be registered;
 C. a server computer communicatively coupled to the network and comprising a server software configured to:
  i. establish an instance of an individual concept for each of one or more words parsed from the domain name, wherein the instance of the individual concept comprises a meaning for each of the one or more words and wherein the meaning is derived from a context of the one or more words;
  ii. identify conceptual classes which share one or more of the plurality of common attributes with the individual concept for each of the one or more words;
  iii. organize the one or more conceptual classes identified into a hierarchy structure comprising one or more subsuming classes and one or more subsumed classes, wherein the one or more subsumed classes inherit the plurality of attributes from the one or more subsuming classes and wherein the one or more subsumed classes comprise one or more localized polymorphic changes to the plurality of attributes;
  iv. identify a hierarchy level at which all of the plurality of attributes of the individual concept are not common to all of the plurality of attributes of the one or more words in the one or more subsumed classes;
  v. return one or more combinations of the domain name with a plurality of suggested top level domains derived by searching all of the one or more words on the hierarchy level; and
  vi. send the plurality of suggested top level domains to the client software for display.

9. The system of claim 8 wherein the plurality of suggested top level domains are calculated according to one or more relationships between one or more of the plurality of common attributes shared by the one or more of the plurality of potential top level domains and the one or more words.

10. The system of claim 9 wherein the one or more relationships are established using a cluster analysis.

11. The system of claim 10 wherein the cluster analysis further comprises a clustering algorithm.

12. The system of claim 10 wherein the cluster analysis further comprises a fuzzy cluster analysis.

13. The system of claim 10 wherein the cluster analysis further comprises quality threshold clustering.

14. The system of claim 10 wherein the cluster analysis further comprises conceptual clustering.

15. The system of claim 8 further comprising an input knowledge agent, a results engine, an ontology language, a clustering algorithm, an output knowledge agent or any combination thereof.

* * * * *